D. W. PATTERSON.
WATER SOFTENING APPARATUS.
APPLICATION FILED SEPT. 6, 1907.
995,556.
Patented June 20, 1911.
3 SHEETS—SHEET 1.
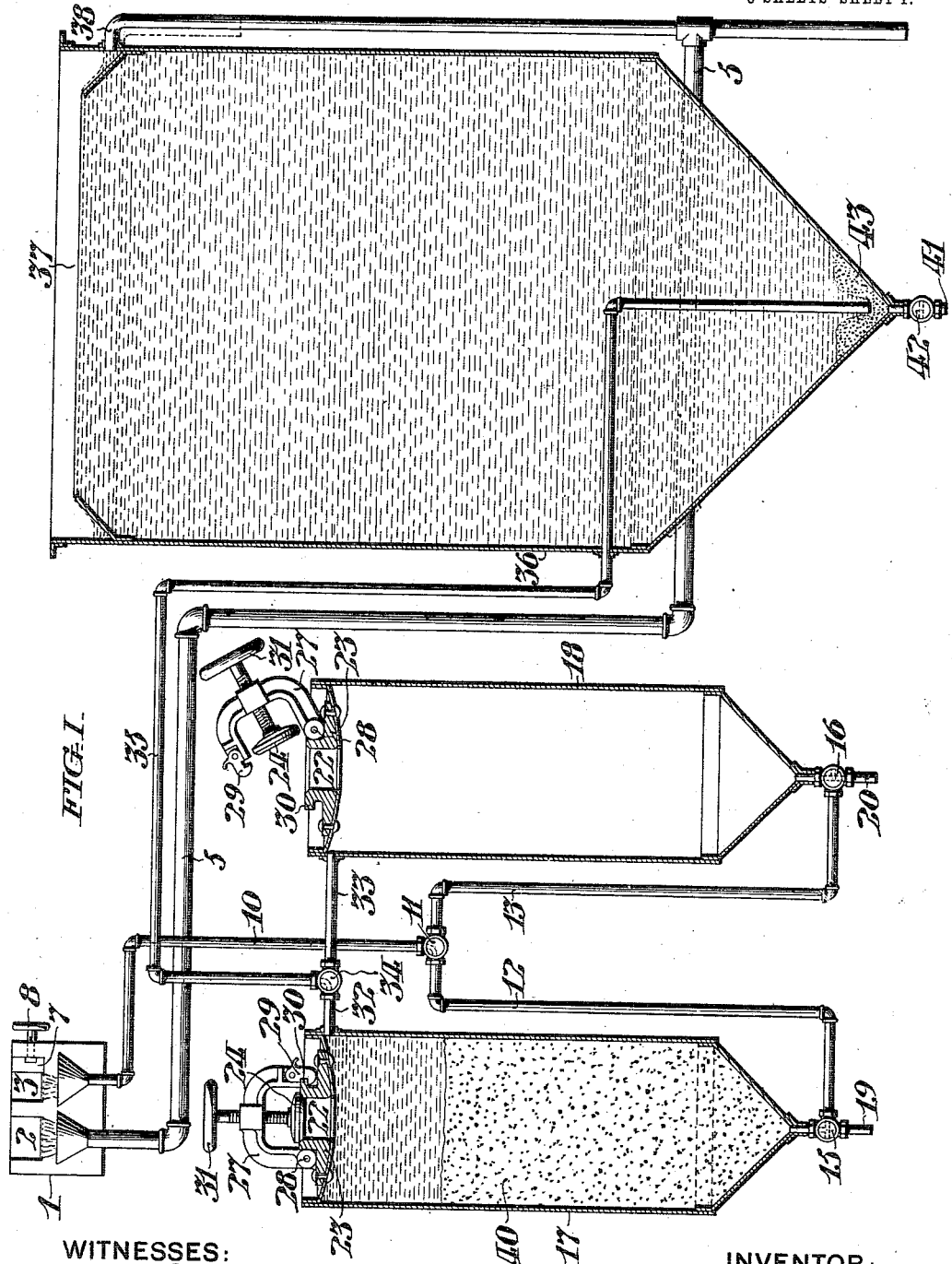
WITNESSES:
Clifton C. Hallowell
Thomas W. Kerr
INVENTOR:
DUNCAN W. PATTERSON,
by Arthur E. Paige
Atty.

D. W. PATTERSON.
WATER SOFTENING APPARATUS.
APPLICATION FILED SEPT. 6, 1907.
995,556.
Patented June 20, 1911.
3 SHEETS—SHEET 2.
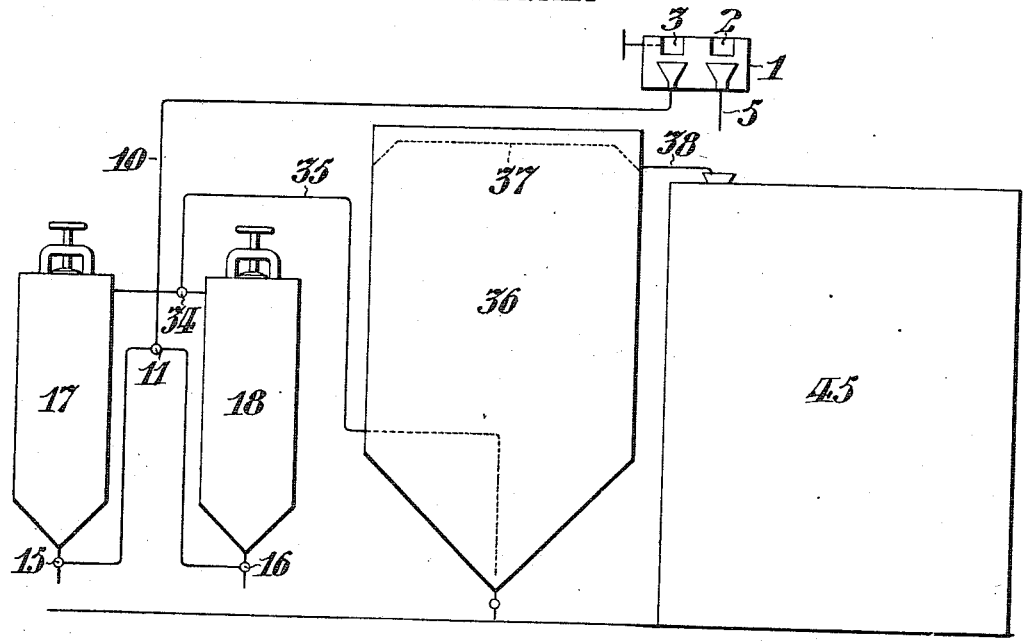
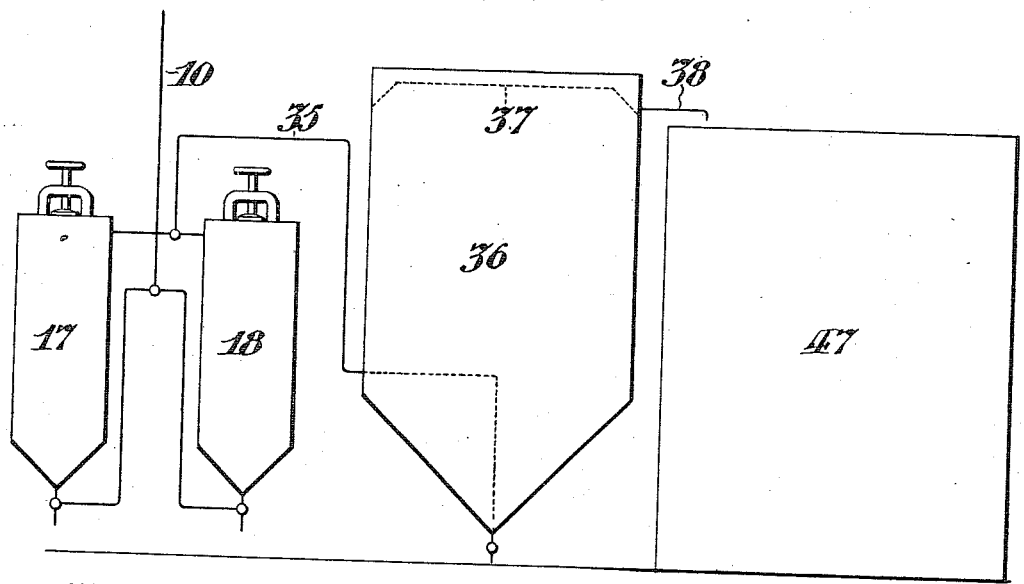
WITNESSES:
INVENTOR:
DUNCAN W. PATTERSON,

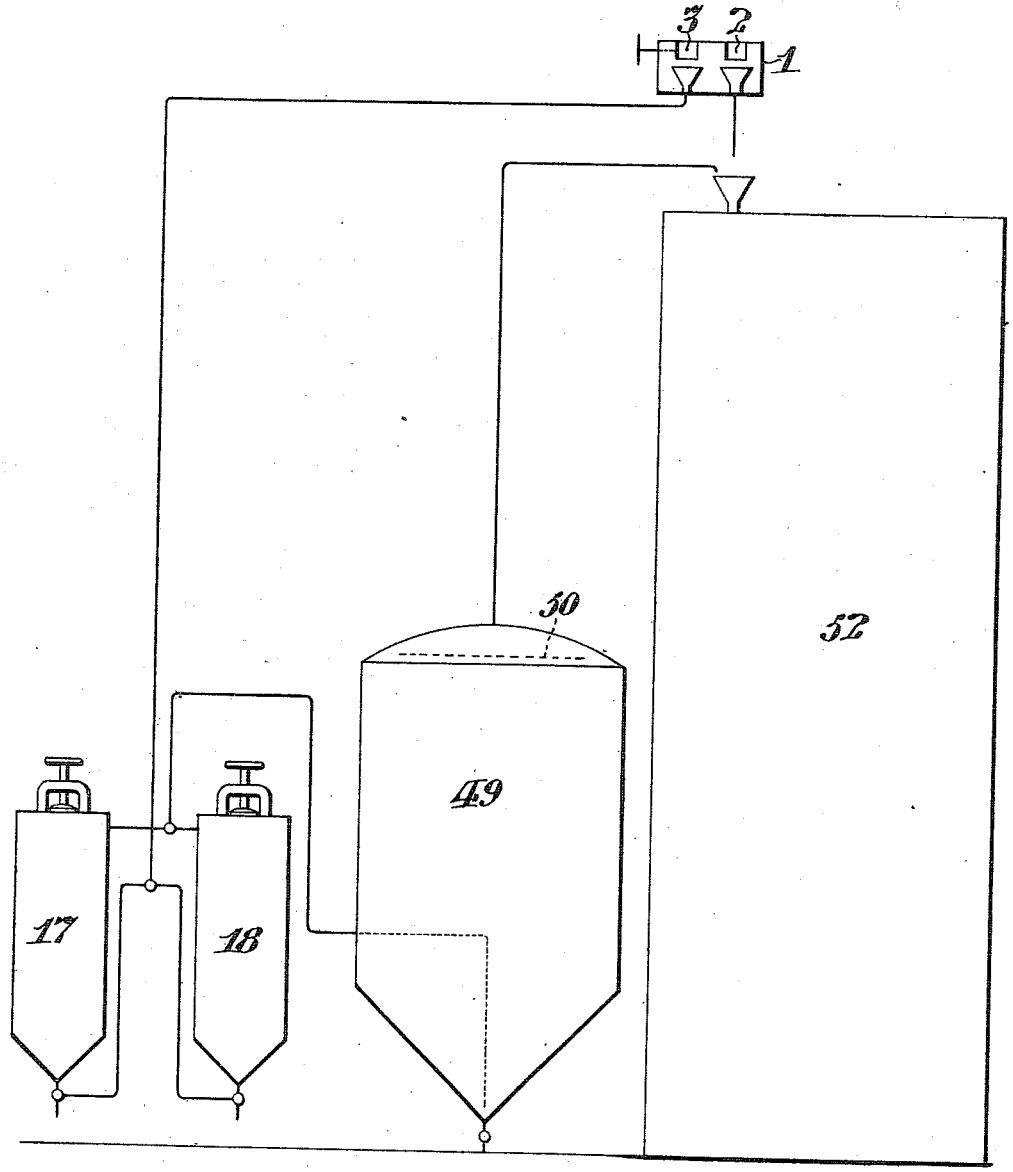

UNITED STATES PATENT OFFICE.

DUNCAN W. PATTERSON, OF PHILADELPHIA, PENNSYLVANIA.

WATER-SOFTENING APPARATUS.

995,556.   Specification of Letters Patent.   Patented June 20, 1911.

Application filed September 6, 1907. Serial No. 391,707.

*To all whom it may concern:*

Be it known that I, DUNCAN W. PATTERSON, of Philadelphia, in the county of Philadelphia and State of Pennsylvania, have invented a certain new and useful Improvement in Water-Softening Apparatus, whereof the following is a specification, reference being had to the accompanying drawings.

My improved apparatus is particularly adapted for forming a solution of calcium hydrate or other chemical of limited solubility; constantly maintaining the strength of said solution at the point of saturation, and, adding said solution to the water to be treated at a rate always proportioned to the total quantity of water under treatment. Moreover, such apparatus may be used to eliminate sulfate compounds or sulfuric acid, from water, by the employment of insoluble barium carbonate, which effects the precipitation thereof by the chemical reaction resulting from being brought in contact with such compounds in a continuous manner.

Moreover, it is to be understood that my improved apparatus may be utilized wherever a proportional or continuous flow of solution of known strength is desired.

An object of my invention is to provide water softening apparatus which may be charged with such reagents in a dry state in quantities sufficient for considerable periods of flow of the water which is to be treated, and so constructed and arranged that the introduction of the reagents may be effected from the ground level or at any region below the point of distribution of the water, and without the use of pumps or mechanical agitating means.

In the form of apparatus hereinafter described, which is particularly adapted for forming a solution of calcium hydrate or other chemical of limited solubility; weirs are employed to divide from the main stream of the water which is to be softened, a stream which may be utilized to form the solution which is to be added to the main stream, and to so effect the division that the respective volumes of said streams are always proportional. Moreover, said weirs are adjustable so that the proportion of the streams may be varied in accordance with any variation in the condition of the water; the latter being determinable by chemical tests.

The proportional stream for the formation of the solution flows from the dividing means aforesaid to either of two tanks which are used in alternation. Said tanks may be of any desired capacity determined by the length of time which it is desired shall elapse between operations of charging the apparatus with the chemical. Said two tanks are connected in parallel relation between the dividing means aforesaid and a saturating tank and are alternately operative to supply the chemical solution to said saturating tank, from which it passes into the main stream of water. However, if such apparatus is to be employed to precipitate sulfate compounds or sulfuric acid as aforesaid, by the use of insoluble barium carbonate, the entire stream of water to be treated may be directed to said two tanks, in alternation, and thence to the saturating tank as hereinafter more particularly described.

My invention comprises the various novel features of construction and arrangement hereinafter more definitely specified.

In the drawings: Figure I, is a vertical sectional view of an apparatus conveniently embodying my improvement. Fig. II, is a diagrammatic elevation of an apparatus including the elements shown on a larger scale in Fig. I, wherein the saturating tank is open to the atmosphere, and the water gravitates therefrom to a lower tank. Fig. III, is a diagrammatic elevation similar to Fig. II, but showing an arrangement of apparatus which may be employed with particular advantage in the treatment of water with barium carbonate. Fig. IV, is a diagrammatic elevation similar to Fig. II, but showing an apparatus wherein the saturating tank is closed to the atmosphere, and the water rises therefrom to a higher tank.

Referring to Figs. I and II, the conduit 1, carries the entire water supply and is provided with two weirs 2, and 3, which divide said supply in two streams. The stream passing from the weir 2, to the pipe 5, is the main body of water to which the chemical solution is to be added. The stream passing from the weir 3, is the proportional stream which is to be employed in forming the chemical solution, and, its proportion to the stream passing from the weir 2, may be variably predetermined by movement of the gate 7, by rotation of the hand wheel 8. Said divisional stream from the weir 3, passes down the pipe 10, to the valve 11, and in accordance with the position of the latter, passes thence into either of the branch pipes 12, or 13, which respectively lead to valves 15, and 16, at the lower ends of the chemical tanks 17, and 18. Said valves 15, and 16, are so constructed that they may be used to contemporaneously prevent communication between said tanks and the branch supply pipes aforesaid and establish communication between said tanks and the respective washout pipes 19, and 20, when it is desired to clean the tanks. Each of said tanks 17, and 18, is provided with a chemical inlet 22, in its upper head 23, which may be hermetically closed by a valve 24. Said valves 24, are conveniently carried by respective yokes 27, pivoted at 28, and provided with pivoted latches 29, for engagement with lugs 30, on said heads, and each valve is carried on a screw threaded stem provided with a hand wheel 31; the arrangement being such that each valve and its yoke may be disengaged and turned aside so as to afford full access to the inlet 22, which it controls. Said tanks 17, and 18, are provided at their upper portions with outlet branch pipes 32, and 33, leading to the valve 34, whereby they may be alternately connected with the pipe 35, which terminates in the bottom of the saturating tank 36. Said saturating tank 36, is provided with the annular weir 37, at its top over which the solution made in said tanks 17, and 18, as hereinafter described, passes to the pipe 38, through which it is discharged into the pipe 5, to mix with the main stream of water which is to be softened.

Said apparatus is operated as follows:— The tanks 17, and 18, are each capable of holding enough moist chemical to produce a quantity of solution which will last for the period of time which it is desired to elapse between the operations of charging said tanks with the chemical. Said charging operation being alternately effected with respect to each tank 17, and 18, as follows, reference being had to the tank 17. The pivoted latch 29, being disengaged from the lug 30, the yoke 27, is turned aside with the valve 24, to fully open the chemical inlet 22. Then a sufficient quantity of the dry chemical is deposited within the tank 17, through said inlet 22, and the yoke reëngaged with the lug 30, by its latch 29, and said inlet 22, sealed by rotation of the hand wheel 31. The valves 11, and 15, are then turned so as to divert the water from the pipe 10, into said tank 17, and, the valve 34, being turned so that communication is established between said tank and the pipe 35, water will pass from the pipe 10, into the tank 17, up through the chemical 40, dissolving a portion, and carrying with it a portion in suspension on account of the velocity with which the water flows through into the bottom of the tank 36. Owing to the relatively large area of said saturating tank 36, and consequently slow velocity of the solution rising therein, the excess of chemical beyond the point of saturation will settle to the bottom of said tank and the solution entering from the pipe 35, will keep it constantly in agitation and increase the certainty of the solution being saturated. As the solution rises to the top of said tank 36, and the excess chemical settles down, the liquid in said tank will gradually clear itself until it reaches the top and flows out as a clear saturated solution of calcium hydrate or lime water over the weir 37, and through the pipe 38, in the form shown in Figs. I and II. I find it convenient to provide the apex of said conical bottom of the tank 36, with the washout pipe 41, controlled by the valve 42, through which the sediment 43, may be discharged when it is desired to clean the apparatus. In this connection it may be noted, as aforesaid, that the valves 15, and 16, may be so turned as to establish communication from the interior of the respective tanks 17, and 18, through the washout pipes 19, and 20, whereby sediment may be discharged from said tanks.

In the form of my invention shown in Fig. II; the outlet pipe 38, carrying from the saturating tank 36, the solution formed with the divisional stream of water from the weir 3, and, the pipe 5, carrying the main stream of water from the weir 2, both discharge into the tank 45, wherein the water softening process is completed.

In the form of my invention shown in Fig. III; which is especially adapted for the employment of barium carbonate for the removal of sulfurous acid; the tanks 17, and 18, are charged with said chemical in powdered form; the entire stream of water to be treated is introduced to the apparatus through the pipe 10; the water passing alternately through the tanks 17, and 18, to the tank 36, will only take up enough of the barium carbonate to precipitate the sulfurous acid, in said tank, and the excess will fall back to the bottom of said tank 36, as above described in the case of the employment of calcium hydrate. The discharge outlet pipe 38, leads from said tank into the tank 47, wherein the carbonates and chlorids are precipitated.

The form of my invention shown in Fig. IV; is similar to the apparatus shown in Figs. I and II, except that the tank 49, which is closed at the top is substituted for the tank 36, and provided with the deflecting plate 50, which like the weir 37, aforesaid prevents the formation of direct currents between the inlet and outlet. This form of my invention is advantageous in that the water may be discharged from the saturating tank 49, at a pressure exceeding that of the atmosphere, so as to be raised to the higher tank 52, in which the softening of the water is effected.

I do not desire to limit myself to the precise details of construction and arrangement above described, as it is obvious that various modifications may be made therein without departing from the scope of the following claims.

I claim:—

1. In water softening apparatus, the combination with a plurality of tanks provided with chemical inlets which may be opened to the atmosphere, of means whereby said inlets may be sealed; a water supply pipe having branches leading respectively to said tanks; means controlling the flow of water from said supply pipe to said tanks, in succession; a conduit carrying the water which is to be treated; a weir in operative relation to said conduit comprising adjustable means to divide from said water, a stream of constant proportion to the main stream and deliver the same to said supply pipe; a precipitation tank; a chemical solution supply pipe terminating in the bottom of said precipitation tank and having branches respectively connected with the upper portions of the other tanks aforesaid; and, means controlling communication between said chemical supply pipe and its branches, arranged to establish communication with said tanks, in succession; an annular weir at the top of said precipitation tank, determining the outflow of liquid therefrom; and, a discharge pipe arranged to receive the liquid which passes said weir in said tank.

2. In water softening apparatus, the combination with a plurality of tanks provided with chemical inlets which may be opened to the atmosphere; of means whereby said inlets may be sealed; a water supply pipe having branches leading respectively to said tanks; means controlling the flow of water from said supply pipe to said tanks, in succession; a precipitation tank; a chemical solution supply pipe terminating in the bottom of said precipitation tank and having branches respectively connected with the upper portions of the other tanks aforesaid; and, means controlling communication between said chemical supply pipe and its branches, arranged to establish communication with said tanks, in succession; an annular weir at the top of said precipitation tank, determining the outflow of liquid therefrom; and, a discharge pipe arranged to receive the liquid which passes said weir in said tank.

3. In water softening apparatus, the combination with a plurality of tanks provided with chemical inlets which may be opened to the atmosphere; of means whereby said inlets may be sealed; a water supply pipe having branches leading respectively to said tanks; means controlling the flow of water from said supply pipe to said tanks, in succession; a precipitation tank; a chemical solution supply pipe terminating in the bottom of said precipitation tank and having branches respectively connected with the upper portions of the other tanks aforesaid; and, means controlling communication between said chemical supply pipe and its branches, arranged to establish communication with said tanks, in succession.

In testimony whereof, I have hereunto signed my name at Philadelphia, Pennsylvania, this 31st day of Aug., 1907.

DUNCAN W. PATTERSON.

Witnesses:
ARTHUR E. PAIGE,
BEULAH M. TEITSWORTH.

---

Copies of this patent may be obtained for five cents each, by addressing the "Commissioner of Patents, Washington, D. C."